United States Patent [19]

Maeda

[11] Patent Number: 4,659,093

[45] Date of Patent: Apr. 21, 1987

[54] THREE-PIECE OIL-RING WITH AN INWARD PROTRUSION

[75] Inventor: Yorishige Maeda, Toyota, Japan

[73] Assignee: Toyota Jidosha Kabushiki Kaisha, Toyota, Japan

[21] Appl. No.: 783,642

[22] Filed: Oct. 3, 1985

[30] Foreign Application Priority Data

Nov. 30, 1984 [JP] Japan .............. 59-180875[U]
Nov. 30, 1984 [JP] Japan .................. 59-251644

[51] Int. Cl.$^4$ .............................................. F16J 9/06
[52] U.S. Cl. ........................... 277/139; 267/1.5; 277/141; 277/215; 277/216
[58] Field of Search ............... 277/138–141, 277/216, 157, 158, 160, 146, 215; 267/1.5

[56] References Cited

U.S. PATENT DOCUMENTS

| | | | |
|---|---|---|---|
| 2,064,576 | 12/1936 | Teetor | 277/159 X |
| 2,078,395 | 4/1937 | Luthy | 267/1.5 |
| 2,110,562 | 3/1938 | Teetor | 267/1.5 |
| 2,170,276 | 8/1939 | Philips | 267/1.5 |
| 2,910,334 | 10/1959 | Hamm | 267/1.5 |
| 3,261,612 | 7/1966 | Games | 277/140 |
| 3,430,968 | 3/1969 | Hesling et al. | 277/160 X |
| 3,606,354 | 9/1971 | Prasse et al. | 277/140 |
| 3,695,622 | 10/1972 | Davis et al. | 277/139 |

*Primary Examiner*—Allan N. Shoap
*Attorney, Agent, or Firm*—Cushman, Darby & Cushman

[57] ABSTRACT

A three-piece oil-ring with a pair of side rails and an expander disposed between the side rails. The expander extends in a circumferential direction and has waves in a radial direction. Flat portions are located at radially inner portions of the expander. At a plurality of the flat portions protrusions extend radially inward. The protrusions contact a bottom surface of an oil-ring groove of a piston and prevents overlapping of the ends of the expander. The protrusion may be provided with holes at both sides thereof and a wire may be passed through the holes to prevent overlapping of the ends of the expander.

9 Claims, 17 Drawing Figures

THREE-PIECE OIL-RING WITH AN INWARD PROTRUSION

BACKGROUND OF THE INVENTION

1. Field of the Invention

The present invention relates to a three-piece oil-ring consisting of a pair of side rails and an expander provided between the paired side-rails.

2. Description of the Prior Arts

Conventional three-piece oil-rings include an expander extending in a circumferential direction and having waves in a radial direction. Both ends of the expander are opposed to each other thereby producing a spring characteristic. It has been necessary to provide a hole in the expander between a radially inner portion and a radially outer portion of the waving form of the expander in order to pass a wire for preventing the ends of the expander from overlapping.

In order to suppress abrasion between a side rail engaging portion formed at a radially inner portion of the expander and a side rail, the circumferential length of the side rail engaging portion has been increased thereby increasing the contact surface area between the side rail engaging portion and the side rail. However, when the circumferential length of the side rail engaging portion of the expander is increased, the radially outer portion of the waving expander must be bent with a relatively tight curvature, i.e., having a small radius. Therefore, when a hole for passing a wire is provided in the expander which has bent sharply, the hole weakens the strength of the expander and durability of the expander is reduced.

On the other hand, if a hole for passing a wire is not provided in the expander, abutted ends of the expander may overlap in the circumferential direction when the expander is in an oil-ring groove of a piston. Such overlapping of the ends of the expander will deteriorate smooth insertion of a piston into a cylinder bore or deteriorate the expanding spring characteristic of the expander thereby increasing oil consumption.

SUMMARY OF THE INVENTION

An object of the present invention is to provide a three-piece oil-ring in which overlapping of the ends of an expander can be prevented without using a wire to provide proper positioning of the ends of the expander, that is, without providing a hole for passing a wire in the expander.

Another object of the present invention is to provide a three-piece oil-ring in which a hole for passing a wire can be provided substantially without reducing the strength of the expander and a wire is passed through the hole thereby preventing overlapping of the ends of the expander without causing reduction of strength of the expander.

The first object listed above is achieved by a three-piece oil-ring which will be described more detailedly hereunder as a first, a second, a third and a fourth embodiments of the present invention. The three-piece oil-ring comprises a pair of side rails spaced apart from each other in an axial direction and an expander disposed between the paired side rails so as to expand the same. The expander extends in a circumferential direction and has waves in a radial direction. At radially inner portions of the expander, flat portions are formed which have side rail engaging portions protruding in an axial direction at opposite axial sides of the expander. Among the flat portions, a plurality of the flat portions have a protrusion extending radially inward.

Second object listed above is achieved by a three-piece oil-ring which will be described more detailedly hereunder as a fifth embodiment of the present invention. The three-piece oil-ring comprises a pair of side rails spaced apart form each other in an axial direction and an expander disposed between the paired side rails so as to expand the same. The expander extends in a circumferential direction and has waves in a radial direction. At radially inner portions of the expander, flat portions are formed which have side rail engaging portions protruding in an axial direction at opposite axial sides of the expander. Among the flat portions, a plurality of the flat portions which exist near the abutted ends of the expander have a protrusion which extends radially inward and has holes for passing a wire therethrough.

In the first construction, since the protrusions of the expander contact a bottom surface of an oil-ring groove of a piston, the expander is prevented from being reduced in diameter. Therefore, overlapping of ends of the expander is prevented and oil consumption due to reduction in expanding force is suppressed.

Also, in the second construction, since the protrusions and holes are formed at radially inner portions of the expander, the bent portions at the radially outer portions of the expander are very unlikely to receive an influence from the hole from the view point of strength and will scarcely be weakened by the hole.

BRIEF DESCRIPTION OF THE DRAWINGS

The above and other objects, features and advantages of the present invention will be become apparent and more readily appreciated from the following detailed description of the preferred exemplary embodiments of the invention taken in conjunction with the accompanying drawings, in which.

DETAILED DESCRIPTION OF THE PREFERRED EMBODIMENTS

Some preferred embodiments of the present invention will be described hereunder referring to the attached drawings.

Figure 8:
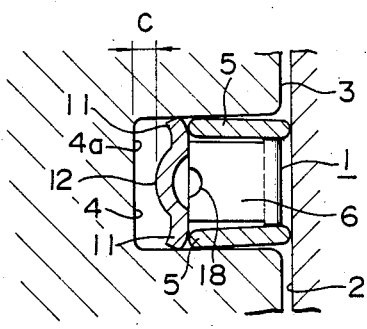
FIG. 8 is a sectional view of the three-piece oil-ring of the second embodiment of the present invention engaged in an oil-ring groove of a piston.
Figure 9:
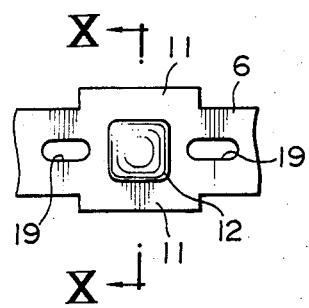
FIG. 9 is a partial elevational view of a protrusion and its vicinity of an expander of a three-piece oil-ring according to a third embodiment of the present invention.
Figure 10:
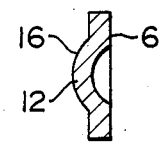
FIG. 10 is a sectional view taken along line X—X in FIG. 9.
Figure 11:
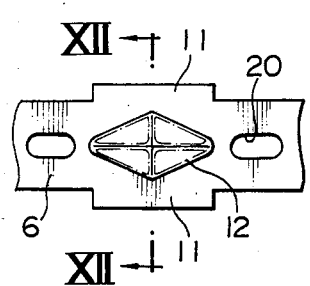
FIG. 11 is a partial elevational view of a protrusion and its vicinity of an expander of a three-piece oil-ring according to a fourth embodiment of the present invention.
Figure 12:
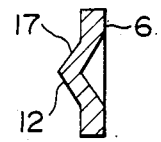
FIG. 12 is a sectional view taken along line XII—XII in FIG. 11.
Figure 13:
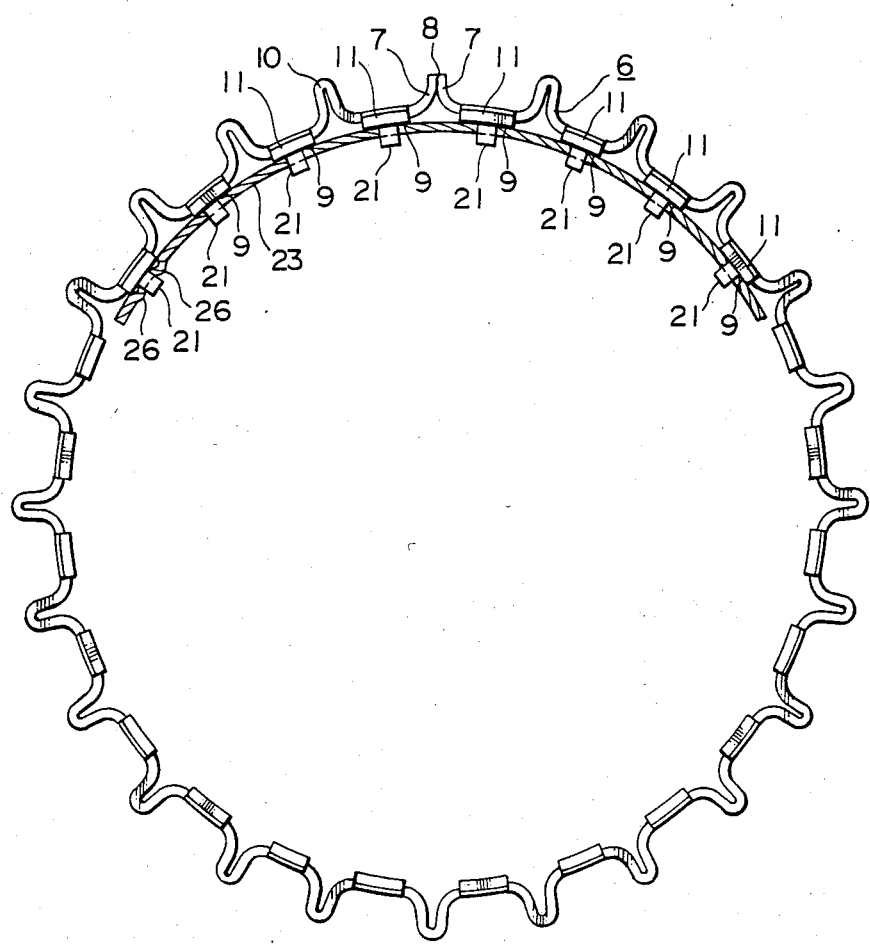
FIG. 13 is a plan view of an expander of a three-piece oil-ring according to a fifth embodiment of the present invention.
Figure 14:
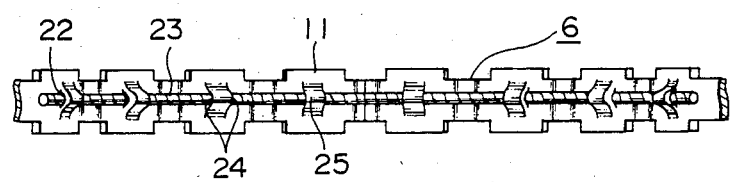
FIG. 14 is a partial elevational view of the expander in FIG. 13 as viewed from inside of the expander.
Figure 15:
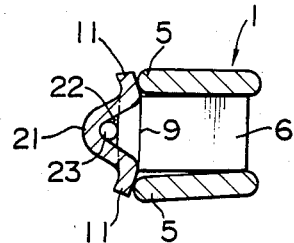
FIG. 15 is a sectional view of the three-piece oil-ring according to the fifth embodiment of the present invention.
Figure 16:
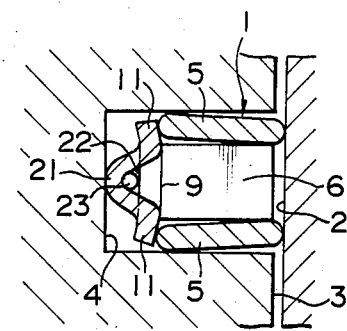
FIG. 16 is a plan view of a side rail.
Figure 17:
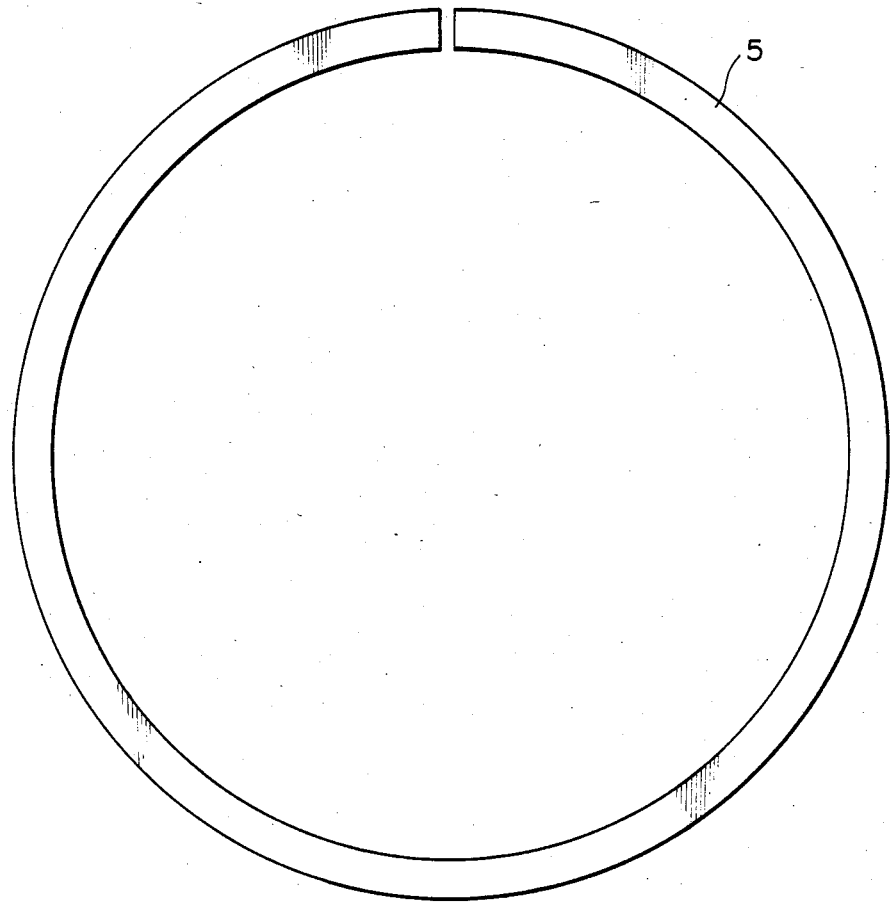
FIG. 17 is a sectional view of the three-piece oil-ring in FIG. 15 engaged in an oil-ring groove of a piston.

FIGS. 1 to 4 show a three-piece oil-ring according to a first embodiment of the present invention, FIGS. 5 to 8 show a second embodiment of the present invention, FIGS. 9 and 10 show a third embodiment of the present invention, FIGS. 11 and 12 show a fourth embodiment of the present invention and FIGS. 13 to 17 show a fifth embodiment of the present invention. A side rail as in FIG. 16 is applicable to any embodiment.

At first, common structures with the first, second, third and fourth embodiments will be described.

Figure 4:
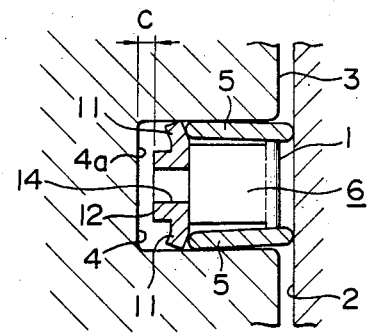
FIG. 4 is a sectional view of the three-piece oil-ring of the first embodiment of the present invention engaged in an oil-ring groove of a piston.

As shown in FIGS. 4 and 8, a three-piece oil-ring 1 is disposed in an oil-ring groove 4 formed in a piston 3 which is reciprocally positioned in a cylinder bore of an internal combustion engine.

Three-piece oil-ring 1 consists of a pair of side rails 5,5 spaced from each other in an axial direction and an expander 6 disposed between paired side rails 5,5 so as to expand side rails 5,5 by the spring force of expander 6.

As shown in FIG. 16, each side rail 5 consists of an elastic metallic annular strip abutted at the ends and has a gap 5a at the abutted portion.

Figure 1:
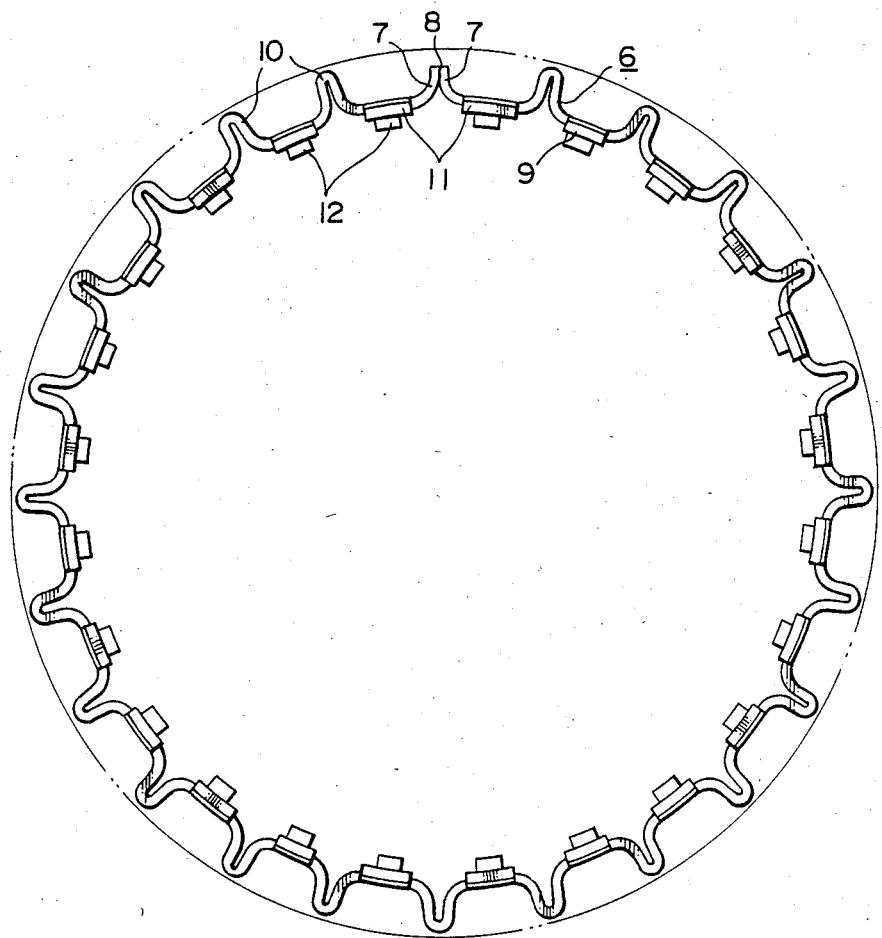
FIG. 1 is a plan view of an expander of a three-piece oil-ring according to a first embodiment of the present invention.
Figure 2:
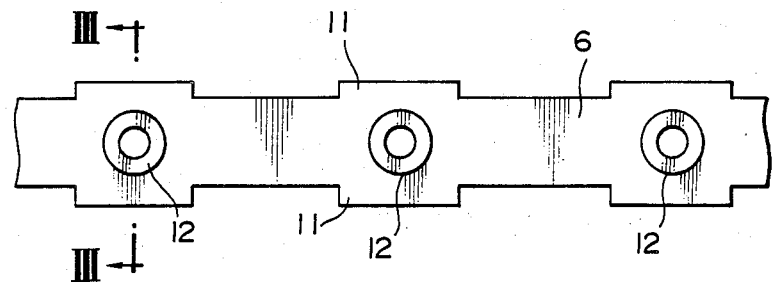
FIG. 2 is a partial elevational view of the expander in FIG. 1 as viewed from inside of the expander.
Figure 3:
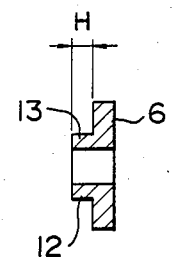
FIG. 3 is a sectional view taken along line III—III in FIG. 2.

As shown in FIGS. 1 and 4, expander 6 is constructed of an annular strip abutted at the ends at a position 8 on its circumference. Expander 6 extends in a circumferential direction and has waves in a radial direction. Expander 6 includes a plurality of flat portions 9 at radially inner portions of the waving form and a plurality of bent portions 10 at radially outer portions of the waving form of expander 6. Flat portions 9 extend longer in the circumferential direction than bent portions 10. At opposite axial sides of radially inner portions 9 side rail engaging portions 11,11 are formed which protrude in the axial direction and extend in the circumferential direction. Side rail engaging portions 11 integrally connect to flat portion 9 of expander 6. A radially outside surface of side rail engaging portion 11 contacts a radially inside surface of each side rail 5 and transmits an expanding force to side rail 5. The ratio of the contacting portion length between side rail engaging portions 11 and side rail 5 to the entire length of expander 6, that is, a contact ratio is preferably set at more than 60%, so that reduction of the expanding force of expander 6 due to abrasion of contact portions between side rail engaging portions 11 and side rail 5 is suppressed.

Figure 5:
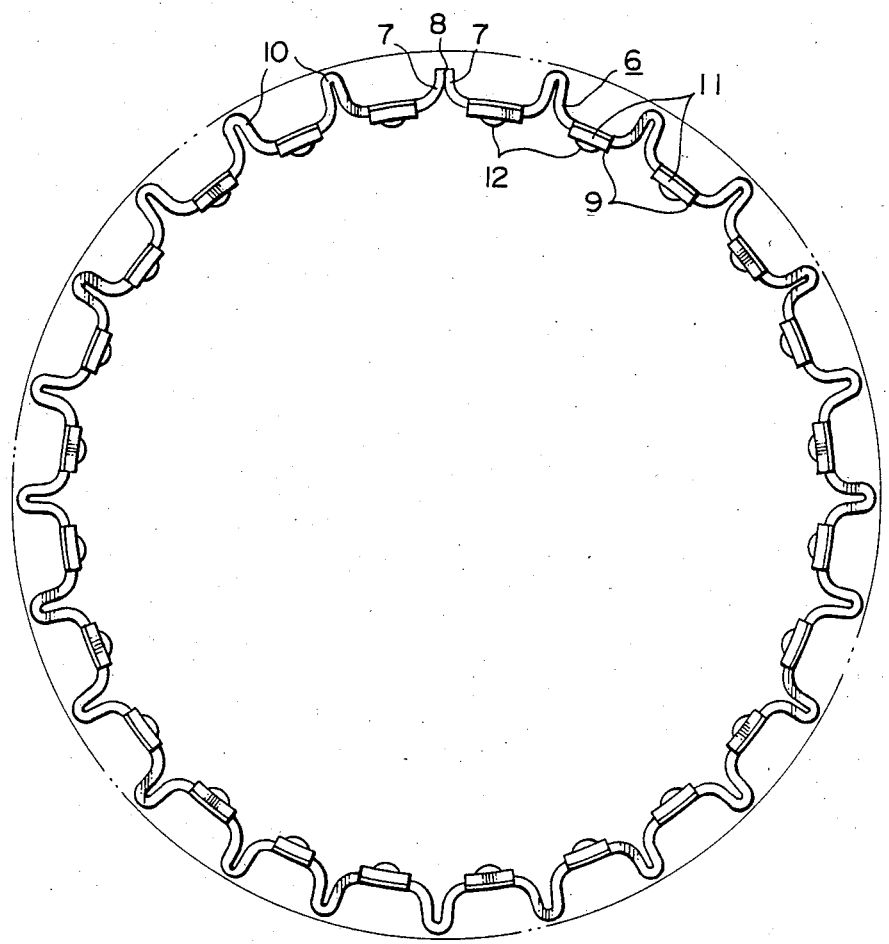
FIG. 5 is a plan view of an expander of a three-piece oil-ring according to a second embodiment of the present invention.
Figure 6:
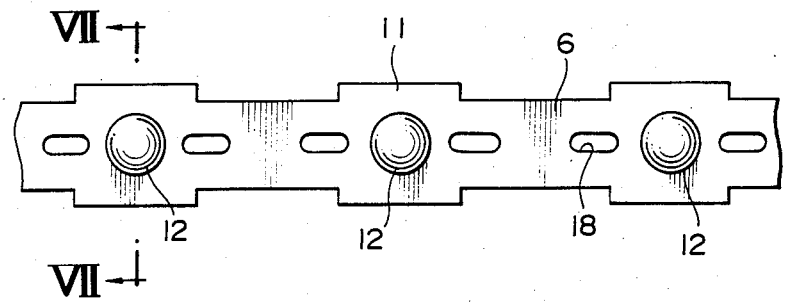
FIG. 6 is a partial enlarged elevational view of the expander in FIG. 5.
Figure 7:
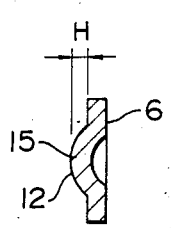
FIG. 7 is a sectional view taken along line VII—VII in FIG. 5.

At a plurality of flat portions 9 protrusions 12 extend radially inward. FIGS. 1 and 5 show a case wherein protrusions 12 are provided at all flat portions 9.

The height H of protrusion 12, that is, the distance between a radially inward end of protrusion 12 and a radially inward surface of flat portion 9 is set at more than 0.2 mm. The distance C between a radially inward end of protrusion 12 and a bottom surface 4a of oil-ring groove 4 when three-piece oil-ring 1 is engaged in oil-ring groove 4 of piston 3 and piston 3 is inserted in cylinder 2 is set at more than 0.2 mm.

As the height of protrusion 12 increases, overlapping of the ends of expander 6 can be decreased. However, if the height of protrusion 12 is set too high, clearance C between expander 6 and bottom surface 4a of oil-ring groove 4 becomes too small and will cause scuffing due to contact pressure. Therefore, height H can not be increased too much and the maximum height should satisfy the condition that clearance C is equal to or more than 0.2 mm. With respect to the minimum value of H of 0.2 mm, height H of 0.2 mm has an effect of $0.2 \times 2 \times 3.14 = 1.2$ mm in the circumferential direction and has the same effect as abutted portion length being reduced by 1.2 mm. Expressing the reduction of the length in an expanding force of expander 6, since the spring constant K of an expander is usually about 1.3 Kg/mm, 1.2 mm corresponds to 1.3 Kg/mm$\times$1.2 mm=1.6 Kg. Usually, 1.6 kg/mm or more of prevention of reduction in expansion force due to abrasion is needed and therefore height H is set at more than 0.2 mm in the present invention.

The detailed structure of protrusion 12 differs according to each embodiment and will be described hereunder.

First Embodiment

In the first embodiment, as shown in FIGS. 1 to 4, protrusion 12 is constructed of a cylinder portion 13 which is formed by pressing a central wall of flat portion 9 into a cylinder-like protrusion protruding radially inward. A bore through cylinder portion 13 functions as an oil-returning hole. The protrusion 12 can easily be formed by pressing.

Second Embodiment

In the second embodiment, as shown in FIGS. 5 to 8, protrusion 12 is formed by pressing a central wall of flat portion 9 radially inward. A section of protrusion 12 is a semicircle and a contour of protrusion 12 as viewed from inside of expander 6 is a circle or an ellipse. Holes 18 are bored in expander 6 at both sides of protrusion 12.

Third Embodiment

In the third embodiment, as shown in FIGS. 9 and 10, protrusion 12 is formed by pressing a central wall of flat portion 9 radially inward. A section of protrusion 12 is a semicircle and a contour of protrusion 12 as viewed from inside of expander 6 is a rectangle or a quadrate. Holes 19 are bored in expander 6 at both sides of protrusion 12.

Forth Embodiment

In the fourth embodiment, as shown in FIGS. 11 and 12, protrusion 12 is formed by pressing a central wall of flat portion 9 radially inward. A section of protrusion 12 is a triangle and a contour of protrusion 12 as viewed from inside of expander 6 is a rectangle or a quadrate.

Holes 20 are bored in expander 6 at both sides of protrusion 12.

Next, effects of the first, second, third and fourth embodiments will be described.

In inserting three-piece oil-ring into oil-ring groove 4 of piston 3, expander 6 is inserted at first and then a pair of side rails 5 are inserted. The inside portion of side rails 5 push side rail engaging portions 11 of expander 6 inward. Therefore expander 6 is pushed against bottom surface 4a of oil-ring groove 4 and both ends of expander are likely to overlap. However, since protrusions 12 are provided at inner portions of expander 6, reduction of diameter of expander 6 is suppressed and overlapping of the ends of expander 6 at abutted portion 8 is prevented.

Therefore, insertion of piston 3 with three-piece oil-ring 1 into cylinder 2 can be easily performed. This is because when three-piece oil-ring 1 is pushed in one direction laterally with respect to an axis of piston 3, protruding of side rail 5 out of oil-ring groove 4 is suppressed due to contact of protrusion 12 of expander 6 with bottom surface 4a of groove 4 and little protruding of side rail makes insertion of piston 3 into cylinder 2 smooth and easy. Improvement of insertion of piston 3 into cylinder 2 makes use of a side rail with a small width possible. Such a side rail with a small width could not be used due to its bad insertion characteristic in spite of its good followability to the cylinder. However, since a side rail with a small width can be used in the present invention, followability of side rail 5 is improved and oil consumption can be suppressed.

Fifth Embodiment

Next, the fifth embodiment of the present invention will be described.

The constructions of three-piece oil-ring 1, cylinder 2, piston 3, oil-ring groove 4, side rail 5, expander 6, ends 7, abutted portion 8, flat portions 9, bent portion 10 and side rail engaging portions 11 are substantially the same as those of the first embodiment. The explanation about the portions 1 to 11 is omitted and the same reference numerals are employed for the respective portions.

In the fifth embodiment, a plurality of flat portions 9 existing near the abutted portion 8 of expander 6 have protrusions 21 protruding radially inward and holes 22 for passing a wire 23 at both sides of protrusion 21.

Protrusion 21 can be formed by cutting a central portion of flat portion 9 with two slits 24 which extend axially and are spaced from each other in the circumferential direction thereby making a band-like portion 25 separated from flat portion 9 by slits 24 and forming band-like portion 25 so as to protrude radially inward. Holes 22 for passing wire 23 can be formed from spaces associated with slits 24 at both sides of band-like portion 25 when band-like portion 25 protrudes radially inward.

Wire 23 passes through holes 22. Wire 23 has bent portions 26 at both sides of at least one of protrusions 21 to prevent wire 23 from disengaging with expander 6.

Next, effects of the fifth embodiment will be described.

Expander 6 is normally abutted at both ends thereof by passing wire 23 through holes 22 of expander 6. Therefore, overlapping of the ends of expander 6 is prevented and reduction of the expanding force due to overlapping does not occur.

Since protrusion 21 and holes 22 are provided at flat portions 9 which exist at radially inner portions of the waving form of expander 6, bent portions 10 which exist at radially outer portions of expander 6 and are apart from holes 22 will suffer little influence in strength and strength reduction of expander 6 does not occur.

Although only preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What I claim is:

1. A three-piece oil-ring for deposition in an oil-ring groove of a piston reciprocally positioned in a cylinder comprising:
    a pair of axially spaced side rails; and
    an expander disposed between said side rails to expand said side rails, said expander extending in a circumferential direction and having waves in a radial direction, the ends of said expander abutting, said expander having flat portions at radially inner portions of said waves and bent portions at radially outer portions of said waves, side rail engaging portions being integrally formed at opposite axial sides of each of said flat portions so as to contact an inner surface of said paired side rails, and said expander further including a protrusion protruding radially inwardly from each of said flat portions said protrusion being adapted to extend a portion of the distance between said flat portion and said groove when disposed therein and including a cylindrical portion formed by pressing a central portion of said flat portion, said cylindrical portion including an oil return hole extending therethrough.

2. The three-piece oil-ring as claimed in claim 1, wherein the height of said protrusion is at least 0.2 mm.

3. The three-piece oil-ring as claimed in claim 1, wherein the distance between a radially inside end of said protrusion and a bottom surface of said oil-ring groove is at least least 0.2 mm.

4. A three-piece oil-ring for deposition in a oil-ring groove of a piston reciprocally positioned in a cylinder comprising:
    a pair of axially spaced side rails; and
    an expander disposed within said side rails to expand said side rails, said expander extending in a circumferential direction and having waves in a radial direction, the ends of said expander abutting, said expander having flat portions at radially inner portions of said waves and bent portions at radially outer portions of said waves, side rail engaging portions being integrally formed at opposite axial sides of each of said flat portions so to contact an inner surface of said paired side rails, at least one of said flat portions further including two circumferentially spaced, axially extending slits, the band-like portion defined between said slits being distored so as to form a protrusion which protrudes radially inward from said flat portion.

5. A three-piece oil-ring as claimed in claim 4, wherein said protrusions are provided on the flat portions disposed adjacent the abutting ends of said expander.

6. The three-piece oil-ring as claimed in claim 4 wherein said slits define holes on opposite sides of said band like portion for passing a wire.

7. The three-piece oil-ring as claimed in claim 6, further comprising a wire passing through the holes of at least one protrusion.

8. The three-piece oil-ring as claimed in claim 7, wherein said wire extends at least through said protrusions provided adjacent the abutting ends of said expander.

9. The three-piece oil-ring as claimed in claim 7, wherein said wire is provided with bent portions at each side of said band-like portion.

* * * * *